(12) United States Patent
Chhabra et al.

(10) Patent No.: US 10,585,999 B2
(45) Date of Patent: Mar. 10, 2020

(54) SELECTION OF DIE AND PACKAGE PARASITIC FOR IO POWER DOMAIN

(71) Applicant: SEAGATE TECHNOLOGY LLC, Cupertino, CA (US)

(72) Inventors: Nitin Kumar Chhabra, Maharashtra (IN); Rohit Halba, Madhya Pradesh (IN)

(73) Assignee: Seagate Technology LLC, Cupertino, CA (US)

(*) Notice: Subject to any disclaimer, the term of this patent is extended or adjusted under 35 U.S.C. 154(b) by 86 days.

(21) Appl. No.: 15/869,484

(22) Filed: Jan. 12, 2018

(65) Prior Publication Data

US 2019/0220562 A1 Jul. 18, 2019

(51) Int. Cl.
  *G06F 17/50* (2006.01)
(52) U.S. Cl.
  CPC ...... *G06F 17/5036* (2013.01); *G06F 17/5045* (2013.01); *G06F 17/5063* (2013.01); *G06F 17/5072* (2013.01); *G06F 17/5081* (2013.01); *G06F 2217/40* (2013.01)
(58) Field of Classification Search
  USPC ....................................................... 716/100
  See application file for complete search history.

(56) References Cited

U.S. PATENT DOCUMENTS

| | | | |
|---|---|---|---|
| 6,175,947 B1 | 1/2001 | Ponnapalli et al. | |
| 9,378,328 B2 | 6/2016 | Buck et al. | |
| 2006/0123366 A1* | 6/2006 | Ogawa | G06F 17/5036 716/115 |
| 2007/0250800 A1 | 10/2007 | Keswick | |
| 2009/0164157 A1* | 6/2009 | Okumura | G06F 17/5036 702/65 |

* cited by examiner

*Primary Examiner* — Bryce M Aisaka
(74) *Attorney, Agent, or Firm* — Kagan Binder, PLLC

(57) ABSTRACT

Systems and methods for selecting die and package parasitic for an input-output (IO) power domain are described. In one embodiment, the method includes determining a minimum on-die decoupling capacitance based at least in part on a product of a number of simultaneously switching IOs of the die and a maximum instantaneous current of an IO; determining a maximum package inductance based at least in part on a maximum operating frequency of an IC and a target impedance of a power delivery network of the die, the IC package, and a printed circuit board (PCB); and determining a maximum die resistance based at least in part on preventing the maximum die resistance from exceeding a maximum static IR drop of the die.

20 Claims, 10 Drawing Sheets

SELECTION OF DIE AND PACKAGE PARASITIC FOR IO POWER DOMAIN

SUMMARY

The present disclosure is directed to methods and systems for selecting die and package parasitic for an input-output (IO) power domain. In some embodiments, the present systems and methods may include an analysis of factors influencing the selection of die and package parasitic for IO power domain.

A computer system for selecting die and package parasitic for an IO power domain is described. In one embodiment, the computer system may include one or more processors. In some embodiments, the one or more processors may determine a minimum on-die decoupling capacitance based at least in part on a product of a number of simultaneously switching IOs of the die and a maximum instantaneous current of an IO (e.g., a die output); determine a maximum package inductance based at least in part on a maximum operating frequency of an integrated circuit (IC) and a target impedance of a power delivery network of the die, the IC package, and a printed circuit board (PCB); and determine a maximum die resistance based at least in part on preventing the maximum die resistance from exceeding a maximum static IR drop of the die.

In some cases, the minimum on-die decoupling capacitance may be based at least in part on a ratio of switching time of an IO to IO supply voltage multiplied by percentage of voltage drop allowed and wherein the switching time is constant for the given IO.

In some cases, the target impedance may be based at least in part on a product of the output supply voltage and a voltage noise tolerance of the die. The voltage noise tolerance may be a percentage of voltage drop allowed when IOs are switching.

In some cases, the target impedance may be based at least in part on a product of the number of simultaneously switching IOs of the die and the maximum instantaneous current of an IO. In some cases, the one or more processors may be further configured to perform a first frequency domain analysis to determine whether a peak resonance associated with the package inductance and the on-die capacitance satisfies the target impedance.

In some cases, upon determining the peak resonance satisfies the target impedance, the one or more processors may be further configured to implement the minimum on-die decoupling capacitance, the maximum package inductance, and the maximum die resistance. In some cases, upon determining the peak resonance fails to satisfy the target impedance, the one or more processors may be further configured to determine voltage fluctuations of the output supply voltage based at least in part on signal integrity power integrity (SI/PI) worst-case analysis, and determine whether the voltage fluctuations are within a predetermined limit.

In some cases, upon determining the voltage fluctuations are within the predetermined limit, the one or more processors may be further configured to implement the minimum on-die decoupling capacitance, the maximum package inductance, and the maximum die resistance. In some cases, upon determining the voltage fluctuations are outside the predetermined limit, the one or more processors may be further configured to repetitively decrease the package inductance by a predetermined decrement and re-determine voltage fluctuations for each decrease until the re-determined voltage fluctuations are within the predetermined limit, or until reaching a minimum package inductance, and implement a package inductance that satisfies the predetermined limit or the minimum package inductance.

In some cases, upon determining the voltage fluctuations are outside the predetermined limit, the one or more processors may be further configured to repetitively increase the on die capacitance by a predetermined increment and re-determine voltage fluctuations for each increase until the re-determined voltage fluctuations are within the predetermined limit, or until reaching a maximum on die capacitance, and implement an on die capacitance that satisfies the predetermined limit or the maximum on die capacitance.

In some cases, upon determining the voltage fluctuations are outside the predetermined limit, the one or more processors may be further configured to add one or more decoupling capacitors to the IC package. In some cases, the one or more processors may be further configured to determine again whether the voltage fluctuations are within the predetermined limit or whether the peak resonance satisfies the target impedance, or both. In some cases, upon determining the voltage fluctuations are outside the predetermined limit, the one or more processors may be further configured to shift an operating frequency from a first range to a second range, and determine whether the system performance is met and the voltage fluctuations are within the predetermined limit or whether the peak resonance satisfies the target impedance, or both.

In some cases, upon determining the system performance is met and the voltage fluctuations are within the predetermined limit, or the peak resonance satisfies the target impedance, or both, the one or more processors may be further configured to implement a current value of the on-die decoupling capacitance, a current value of the package inductance, and a current value of the die resistance. In some cases, upon determining system performance is not met and/or the voltage fluctuations are outside the predetermined limit and the peak resonance fails to satisfy the target impedance, the one or more processors may be further configured to shift the operating frequency back to the first range and implement an alternate process to mitigate the peak resonance.

An apparatus for selecting die and package parasitic for an IO power domain is also described. In one embodiment, the apparatus may include a processor, memory in electronic communication with the processor, and instructions stored in the memory, the instructions being executable by the processor to determine a minimum on-die decoupling capacitance based at least in part on a product of a number of simultaneously switching IOs of the die and a maximum instantaneous current of an IO; determine a maximum package inductance based at least in part on a maximum operating frequency of an IC and a target impedance of a power delivery network of the die, IC package, and a printed circuit board (PCB); and determine a maximum die resistance based at least in part on preventing the maximum die resistance from exceeding a maximum static IR drop of the die.

A method for selecting die and package parasitic for an IO power domain is also described. In one embodiment, the method may include determining a minimum on-die decoupling capacitance based at least in part on a product of a number of simultaneously switching IOs of the die and a maximum instantaneous current of an IO; determining a maximum package inductance based at least in part on a maximum operating frequency of an IC and a target impedance of a power delivery network of the die, IC package, and a printed circuit board (PCB); and determining a maximum die resistance based at least in part on preventing the maximum die resistance from exceeding a maximum static IR drop of the die.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, including their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components, including those having a dash and a second reference label, apply to other similar components. If only the first reference label is used in the specification, the description is applicable to any one of the similar components having the same first reference label irrespective of the second reference label.

DETAILED DESCRIPTION

Figure 1:
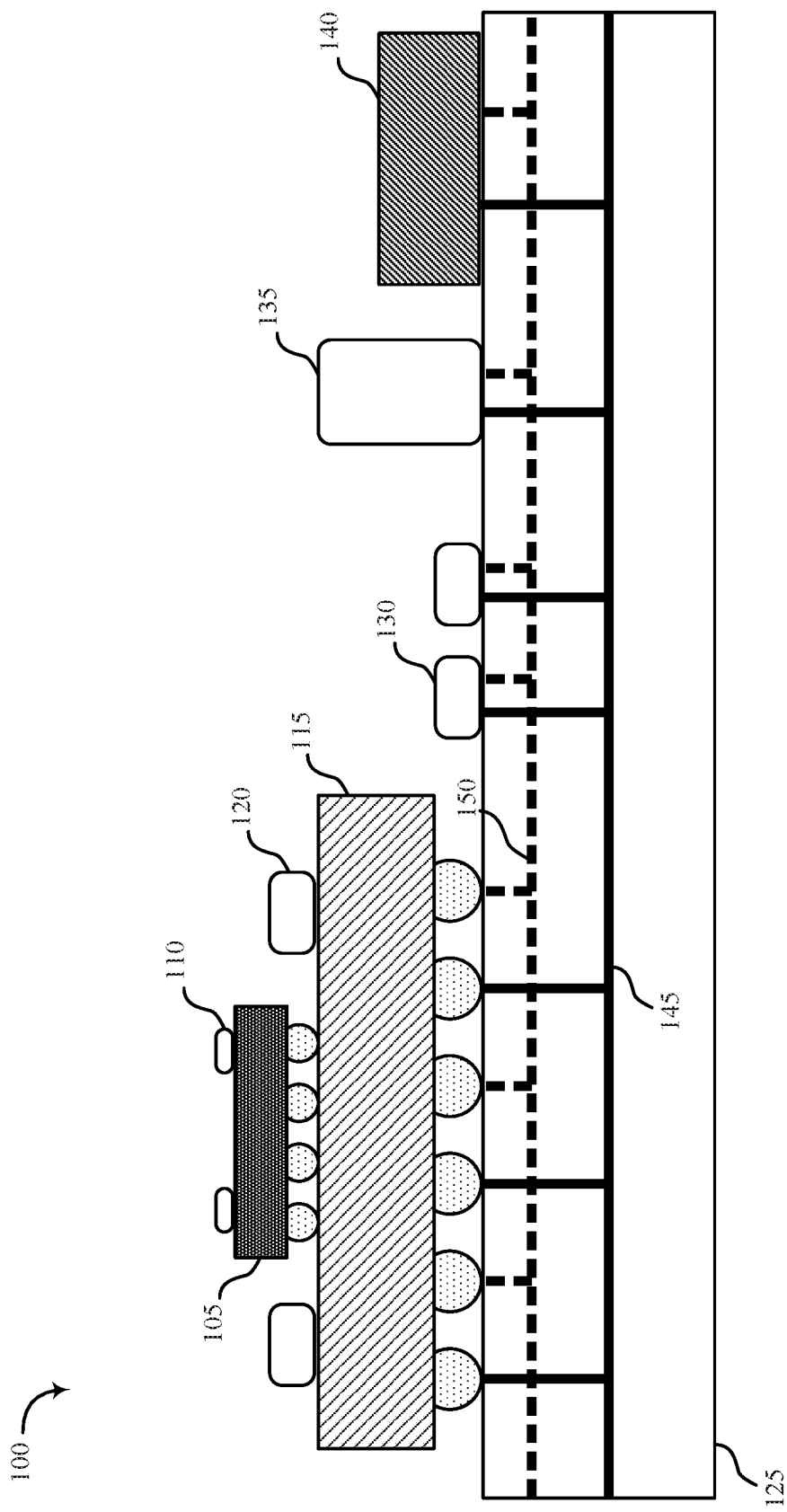
FIG. 1 is a block diagram of an example of an environment in which the present systems and methods may be implemented.

The following relates generally to selecting die and package parasitic for an IO power domain. In one embodiment, there may be various factors like resonance, operation frequency, target impedance etc., which influence the selection of integrated circuit (IC) die and package parasitic. It is noted that an IC die may also be referred to as an IC chip. A method to select the die parasitic including on-die decoupling capacitor and package parasitic is provided by the present systems and methods. In one embodiment, the present systems and methods optimize all parasitic value such that, the influencing factors are analyzed and optimized. The flow of the present systems and methods not only ensures that sufficient current is provided to a number of simultaneous switching outputs, but also ensures that on-die capacitors have sufficient time to charge, resulting in the voltage on the input-output (IO) power rail being within a predetermined voltage tolerance, (e.g., within 10% of supply voltage as one example).

As IC processes move towards smaller and smaller process technologies (e.g., from 65 nm to 16 nm and lower), the IO supply voltage decreases as well (e.g., from 3.3 volts to 1.2 volts). Due to the reduction in supply voltage, noise margin and voltage tolerance may decrease. Also, device density may be increased as a result of smaller process technologies, which results in an increase in the instantaneous transient current density. To provide such high instantaneous transient current within picoseconds from IO supply voltage, on-die decoupling capacitor may be placed on or inside an IC die. The on-die decoupling capacitors may be configured to provide as nearly instantaneous transient current as possible and maintain the IO supply voltage within the voltage tolerance. The package resistance, inductance and capacitance with die resistance may plays a role in the IO power domain path, which may be optimized with on-die decoupling capacitors. The package parasitic and die parasitic may be selected to provide sufficient current to multiple simultaneously switching outputs, and to allow capacitors sufficient time to recharge so that the available voltage on the IO power rail remains within the voltage tolerance.

The analysis of package and die parasitic come under the design of the power distribution network (PDN). To ensure a relatively small ripple in on-die IO supply voltage under the switching current influence, the impedance of network is configured to be smaller than the target impedance in a frequency range from DC to maximum operating frequency. The target impedance of a simple model of PDN is defined by equation 1 (Eq. 1) below.

$$ZPDN(f) \leq Ztarget = \frac{IO_{SupplyVoltage} \times \frac{(Vripple \text{ tolerance } \%)}{100}}{I_{MAX}} \quad \text{(Eq. 1)}$$

In Eq. 1, $V_{ripple\_tolerance}\%$ may be defined as the voltage noise tolerance for the respective integrated circuit; $I_{MAX}$ may be defined as the maximum dynamic current drawn by the IOs; $Z_{Target}$ may be defined as the maximum allowable impedance of the PDN; and $Z_{PDN}(f)$ may be defined as the impedance profile of the PDN as seen by the die.

On-Die capacitors may be configured to ensure the variation of IO supply voltage is within a given voltage tolerance. The transient current during IO switching may have relatively high frequency components. The capacitor on PCB and IC package may be incapable to function at such high frequencies. In some cases, on-die capacitors may be used to cope with the relatively high frequencies of the smaller process technologies, resulting in the instantaneous current for switching being provided by the on-die capacitors.

In situations where the on-die capacitors are not sufficient to provide the specified transient current, IO would draw the current from package/board capacitors. Due to the package/board inductance in the current path, there is an additional dynamic voltage drop of (L×dI/dt) on the IO supply voltage.

Thus, in some cases the variation/ripple in on-die IO supply voltage may exceed the given voltage tolerance.

Die resistance may also play a role in static IR drop limitation on IO power path. IR drop refers to a voltage drop that appears at the resistive component of any impedance. IR drop is the electrical potential difference between the two ends of a conducting phase during a current flow. This voltage drop across any resistance is the product of current (I) passing through resistance and resistance value (R).

IR drop across the IC die may be directly proportional to the current drawn by die. Apart from this, the die resistance along with package resistance also contributes in lowering the resonance peak between die capacitance and package inductance. Package inductance electrically segregates package from board. Package inductance may act as a barrier for the charging of the on-die decoupling capacitor, and may be responsible for dynamic (L×dI/dt) drop. Package capacitance may be configured to supply additional current (at a relatively medium or middle frequency) as on-die capacitors are small and IO may need more current than the capacity provided by the on-die capacitors.

In the conventional solution, the current through the capacitor is related as indicated below in equation 2 (Eq. 2).

$$I = \frac{\Delta Q}{\Delta t} = C \frac{\Delta V}{\Delta t} \quad \text{(Eq. 2)}$$

And the value of on-die capacitor is provided as shown below in equation 3 (Eq. 3).

$$C_{DIE} = (I_{switching\_past}) \times \frac{\Delta t}{\Delta V} \quad \text{(Eq. 3)}$$

In Eq. 3, $\Delta t$ may be defined as switching time of IO in seconds; $\Delta V$ may be defined as IO supply voltage multiplied by the decimal form of the percentage of voltage drop allowed in volts; $I_{switching\_past}$ may be defined as the maximum instantaneous current of simultaneously switching outputs in Amperes. The die resistance, package resistance, and package inductance are preferred to be as low as possible. Package capacitors may be used as needed per implementation.

However, this conventional solution only gives minimum value on on-die capacitor. The conventional solution does not take into account other considerations such as resonance, operation frequency, etc., which may alter the final value of on-die capacitors. In the conventional solution, other parasitic are chosen to give the maximum power delivery without considering the effect of resonance and operating efficiency. For example, low package inductance may be desirable for low dynamic (L×dI/dt) drop, but it may be that lower inductance resonates with the given die capacitance at operation frequencies. In such scenarios, low inductance becomes a bane instead of a boon.

FIG. 1 is a block diagram illustrating one embodiment of an environment 100 in which the present systems and methods may be implemented. In one embodiment, the environment 100 depicts a cross-sectional view of a power distribution system. The environment 100 may be based on a printed circuit board (PCB) on which voltage regulator module, an integrated circuit (IC) package, die, and hierarchy of decoupling capacitors are mounted.

As depicted, environment 100 may include die 105, one or more on-die capacitors 110, IC package 115, one or more package capacitors 120, PCB 125, one or more board or PCB ceramic capacitors 130, one or more board bulk capacitors 135, and voltage regulator module (VRM) 140. Also as depicted, environment 100 may include power plane 145 and ground plane 150.

In one embodiment, environment 100 may be implemented in any electronic and/or computing device implementing a printed circuit board. As one example, environment 100 may depict a PCB, package, and die associated with a storage device such as hard disk drives, solid state drives, and/or hybrid drives that include both hard disk and solid state drives.

Figure 2:
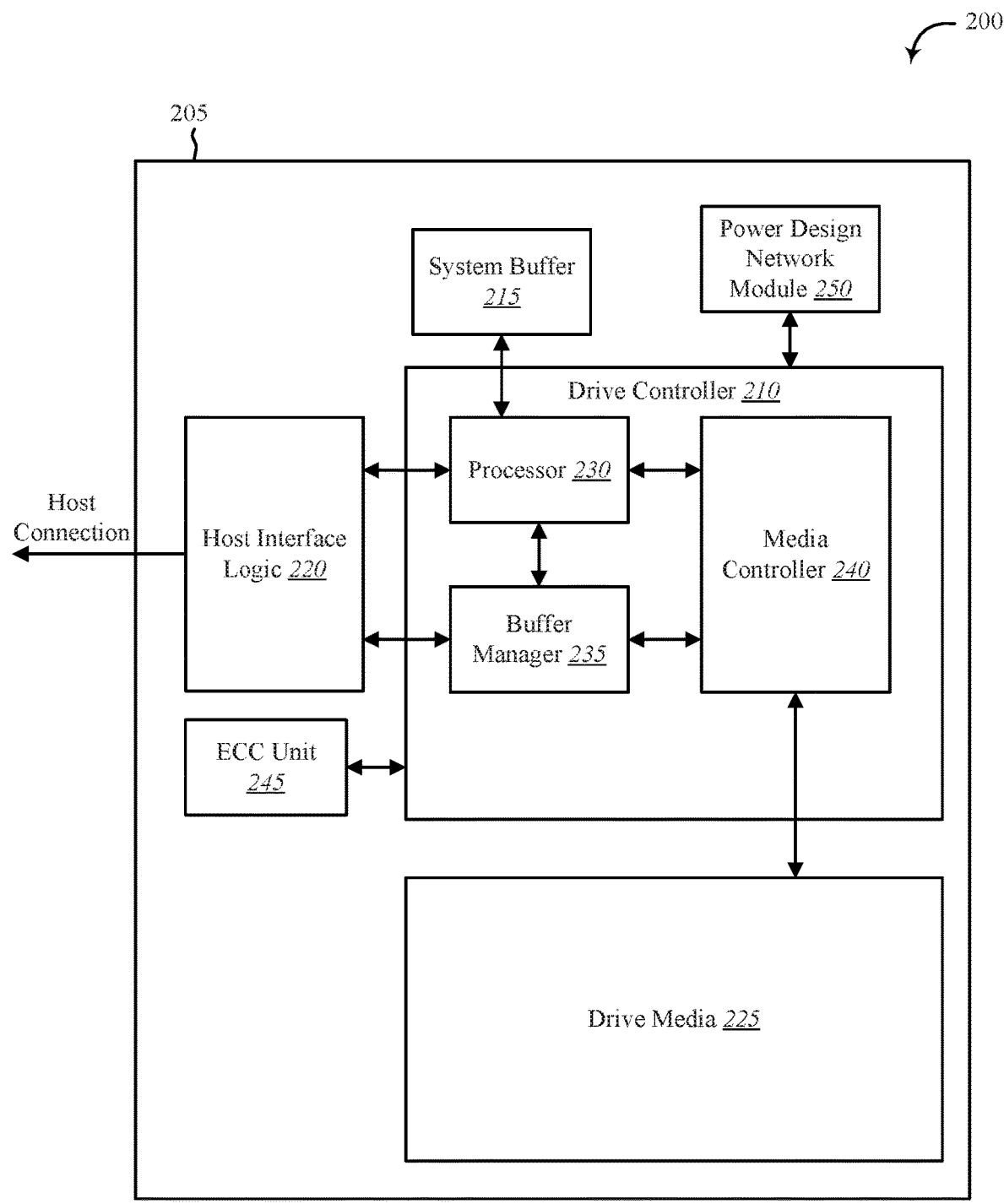
FIG. 2 shows a block diagram of a device in accordance with various aspects of this disclosure.

FIG. 2 shows a block diagram 200 of an apparatus 205 for use in electronic communication, in accordance with various aspects of this disclosure. The apparatus 205 may be an example of a device in which environment 100 of FIG. 1 may be implemented. The apparatus 205 may include a drive controller 210, system buffer 215, host interface logic 220, drive media 225, and power design network module 250. Each of these components may be in communication with each other and/or other components directly and/or indirectly.

One or more of the components of the apparatus 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used such as Structured/Platform ASICs, Field Programmable Gate Arrays (FPGAs), and other Semi-Custom ICs, which may be programmed in any manner known in the art. The functions of each module may also be implemented, in whole or in part, with instructions embodied in memory formatted to be executed by one or more general and/or application-specific processors.

In one embodiment, the drive controller 210 may include a processor 230, a buffer manager 235, and a media controller 240. The drive controller 210 may process, via processor 230, read and write requests in conjunction with the host interface logic 220, the interface between the apparatus 205 and the host of apparatus 205. The system buffer 215 may hold data temporarily for internal operations of apparatus 205. For example, a host may send data to apparatus 205 with a request to store the data on the drive media 225. Drive media 225 may include one or more disk platters, flash memory, any other form of non-volatile memory, or any combination thereof. The driver controller 210 may process the request and store the received data in the drive media 225. In some cases, a portion of data stored in the drive media 225 may be copied to the system buffer 215 and the processor 230 may process or modify this copy of data and/or perform an operation in relation to this copy of data held temporarily in the system buffer 215. In some cases, ECC unit 245 may perform error correction on data stored in drive media 225.

In some embodiments, power design network module 250 may include at least one of one or more processors, one or more memory devices, one or more storage devices, instructions executable by one or more processors stored in one or more memory devices and/or storage devices, or any combination thereof. Although depicted outside of drive controller 210, in some embodiments, power design network module 250 may include software, firmware, and/or hardware located within drive controller 210 and/or operated in conjunction with drive controller 210. For example, power design network module 250 may include at least a portion of processor 230, buffer manager 235, and/or media controller 240. In one example, power design network module 250 may include one or more instructions executed by processor 230, buffer manager 235, and/or media controller 240.

Figure 3:
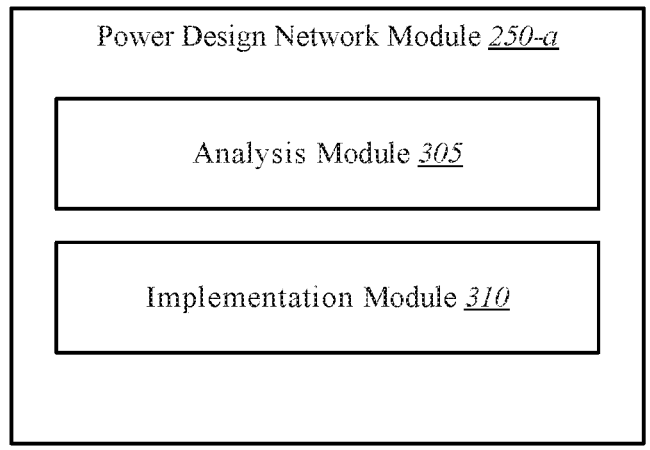
FIG. 3 shows a block diagram of one or more modules in accordance with various aspects of this disclosure.

FIG. 3 shows a block diagram of power design network module 250-a. The power design network module 250-a may include one or more processors, memory, and/or one or more storage devices. The power design network module 250-a may include analysis module 305 and implementation module 310. The power design network module 250-a may be one example of power design network module 250 of FIG. 2. Each of these components may be in communication with each other.

In one embodiment, analysis module 305 may be configured to determine a minimum on-die decoupling capacitance based at least in part on a product of a number of simultaneously switching IOs of the die and a maximum instantaneous current of an IO.

In one embodiment, the IC package may be placed, with the die, on a printed circuit board (PCB). In some cases, one or more determinations made by power design network module 250-a, analysis module 305, and/or implementation module 310, or any combination thereof, may be based at least in part on an assumption that no decoupling capacitor is placed on the package.

In some embodiments, analysis module 305 may be configured to determine a maximum package inductance based at least in part on a maximum operating frequency of an IC. In some embodiments, analysis module 305 may be configured to determine a target impedance of a power delivery network of the die, the IC package, and/or the PCB. In some embodiments, analysis module 305 may be configured to determine a maximum die resistance based at least in part on preventing the maximum die resistance from exceeding a maximum static IR drop of the die (e.g., maximum static IR drop of the die may be any value in the range 1-5% of the output supply voltage).

In some cases, the minimum on-die decoupling capacitance may be based at least in part on a ratio of switching time of an IO to IO supply voltage multiplied by percentage of voltage drop allowed. In some cases, the switching time is constant for given IO. In some embodiments, the target impedance may be based at least in part on a product of the output supply voltage and a voltage noise tolerance of the die.

In some cases, the target impedance may be based at least in part on a product of the number of simultaneously switching IOs of the die and the maximum instantaneous current of an IO. In some embodiments, analysis module 305 may be configured to perform a first frequency domain analysis to determine whether a peak resonance associated with the package inductance and the on-die capacitance satisfies the target impedance.

In one embodiment, upon determining the peak resonance satisfies the target impedance, implementation module 310 may be configured to implement the minimum on-die decoupling capacitance, the maximum package inductance, and/or the maximum die resistance, or any combination thereof. In one embodiment, satisfying the target impedance may refer to the peak resonance being less than the target impedance. And in some cases, failing to satisfy the target impedance may refer to the peak resonance being greater than or equal to the target impedance. Alternatively, satisfying the target impedance may refer to the peak resonance being less than or equal to the target impedance. And in some cases, failing to satisfy the target impedance may refer to the peak resonance being greater than the target impedance.

In some embodiments, upon determining the peak resonance fails to satisfy the target impedance, analysis module 305 may be configured to determine voltage fluctuations of the output supply voltage based at least in part on signal integrity power integrity (SI/PI) worst-case analysis. In some embodiments, analysis module 305 may be configured to determine whether the voltage fluctuations are within a predetermined limit. The predetermined limit may refer to a predetermined limit of voltage fluctuations. Thus, determining whether the voltage fluctuations are within the predetermined limit may refer to determining whether the voltage fluctuations are smaller than a predetermined voltage tolerance (e.g., any value within the range 5%-15% of supply voltage).

In some embodiments, upon determining the voltage fluctuations are within the predetermined limit, implementation module 310 may be configured to implement the minimum on-die decoupling capacitance, the maximum package inductance, and/or the maximum die resistance, or any combination thereof.

In some embodiments, upon determining the voltage fluctuations are outside the predetermined limit, implementation module 310 may be configured to repetitively decrease the package inductance by a predetermined decrement and re-determine voltage fluctuations for each decrease until the re-determined voltage fluctuations are within the predetermined limit, or until reaching a minimum package inductance. In some examples, the predetermined decrement may be based at least in part on an impedance profile of the package inductance obtained from performing at least a second frequency domain analysis. In some embodiments, implementation module 310 may be configured to implement a package inductance that satisfies the predetermined limit or the minimum package inductance.

In some embodiments, upon determining the voltage fluctuations are outside the predetermined limit, implementation module 310 may be configured to repetitively increase the on die capacitance by a predetermined increment and re-determine voltage fluctuations for each increase until the re-determined voltage fluctuations are within the predetermined limit, or until reaching a maximum on die capacitance. In some examples, the predetermined increment may be based at least in part on an impedance profile of the on die capacitance obtained from performing at least a second frequency domain analysis.

In some embodiments, implementation module 310 may be configured to implement an on die capacitance that satisfies the predetermined limit or the maximum on die capacitance. In some embodiments, upon determining the voltage fluctuations are outside the predetermined limit, implementation module 310 may be configured to add one or more decoupling capacitors to the IC package.

In some embodiments, upon determining the voltage fluctuations are outside the predetermined limit, implementation module 310 may be configured to shift an operating frequency from a first range to a second range. In some embodiments, analysis module 305 may be configured to determine again whether the voltage fluctuations are within the predetermined limit or whether the peak resonance satisfies the target impedance, or both.

In some embodiments, upon determining the voltage fluctuations are within the predetermined limit, or the peak resonance satisfies the target impedance, or both, implementation module 310 may be configured to implement a current value of the on-die decoupling capacitance, a current value of the package inductance, and/or a current value of the die resistance, or any combination thereof.

In some embodiments, upon determining the system performance is not met and/or the voltage fluctuations are outside the predetermined limit and the peak resonance fails to satisfy the target impedance, implementation module 310 may be configured to shift the operating frequency back to the first range and implement an alternate process to mitigate the peak resonance.

Figure 4:
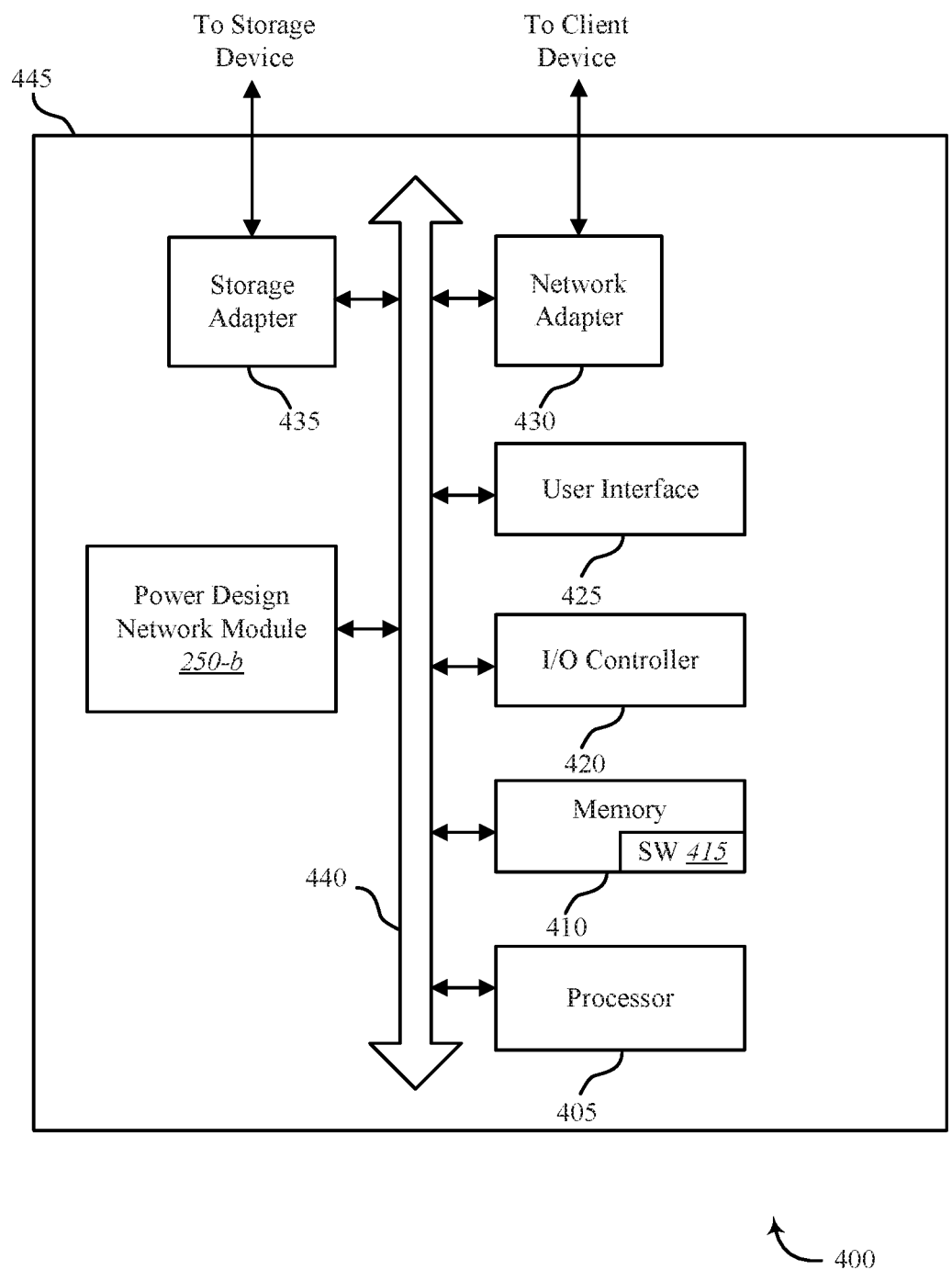
FIG. 4 shows a diagram of a system in accordance with various aspects of this disclosure.

FIG. 4 shows a system 400 for selecting die and package parasitic for an IO power domain, in accordance with various examples. System 400 may include an apparatus 445, which may be an example of device 205 of FIG. 2.

Apparatus 445 may include components for bi-directional voice and data communications including components for transmitting communications and components for receiving communications. For example, apparatus 445 may communicate bi-directionally with one or more storage devices and/or client systems. This bi-directional communication may be direct (apparatus 445 communicating directly with a storage system, for example) and/or indirect (apparatus 445 communicating indirectly with a client device through a server, for example).

Apparatus 445 may also include a processor module 405, and memory 410 (including software/firmware code (SW) 415), an input/output controller module 420, a user interface module 425, a network adapter 430, and a storage adapter 435. The software/firmware code 415 may be one example of a software application executing on apparatus 445. The network adapter 430 may communicate bi-directionally, via one or more wired links and/or wireless links, with one or more networks and/or client devices. In some embodiments, network adapter 430 may provide a direct connection to a client device via a direct network link to the Internet via a POP (point of presence). In some embodiments, network adapter 430 of apparatus 445 may provide a connection using wireless techniques, including digital cellular telephone connection, Cellular Digital Packet Data (CDPD) connection, digital satellite data connection, and/or another connection. The apparatus 445 may include power design network module 250-b, which may perform the functions described above for the power design network module 250 of FIGS. 1, 2, and/or 3.

The signals associated with system 400 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals. The network adapter 430 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), or any combination thereof.

One or more buses 440 may allow data communication between one or more elements of apparatus 445 such as processor module 405, memory 410, I/O controller module 420, user interface module 425, network adapter 430, and storage adapter 435, or any combination thereof.

The memory 410 may include random access memory (RAM), read only memory (ROM), flash memory, and/or other types. The memory 410 may store computer-readable, computer-executable software/firmware code 415 including instructions that, when executed, cause the processor module 405 to perform various functions described in this disclosure. Alternatively, the software/firmware code 415 may not be directly executable by the processor module 405 but may cause a computer (when compiled and executed, for example) to perform functions described herein. Alternatively, the computer-readable, computer-executable software/firmware code 415 may not be directly executable by the processor module 405, but may be configured to cause a computer, when compiled and executed, to perform functions described herein. The processor module 405 may include an intelligent hardware device, for example, a central processing unit (CPU), a microcontroller, an application-specific integrated circuit (ASIC), field programmable gate array (FPGA), or any combination thereof.

In some embodiments, the memory 410 may contain, among other things, the Basic Input-Output system (BIOS) which may control basic hardware and/or software operation such as the interaction with peripheral components or devices. For example, at least a portion of the power design network module 250-b to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface such as network adapter 430.

Many other devices and/or subsystems may be connected to and/or included as one or more elements of system 400 (for example, a personal computing device, mobile computing device, smart phone, server, internet-connected device, cell radio module, or any combination thereof). In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be a mobile device operation system, a desktop/laptop operating system, or another known operating system.

The I/O controller module 420 may operate in conjunction with network adapter 430 and/or storage adapter 435. The network adapter 430 may enable apparatus 445 with the ability to communicate with client devices such as device 105 of FIG. 1, and/or other devices over a communication network. Network adapter 430 may provide wired and/or wireless network connections. In some cases, network adapter 430 may include an Ethernet adapter or Fibre Channel adapter. Storage adapter 435 may enable apparatus 445 to access one or more data storage devices such as storage device 110. The one or more data storage devices may include two or more data tiers each. The storage adapter 445 may include one or more of an Ethernet adapter, a Fibre Channel adapter, Fibre Channel Protocol (FCP) adapter, a SCSI adapter, and iSCSI protocol adapter.

Figure 5:
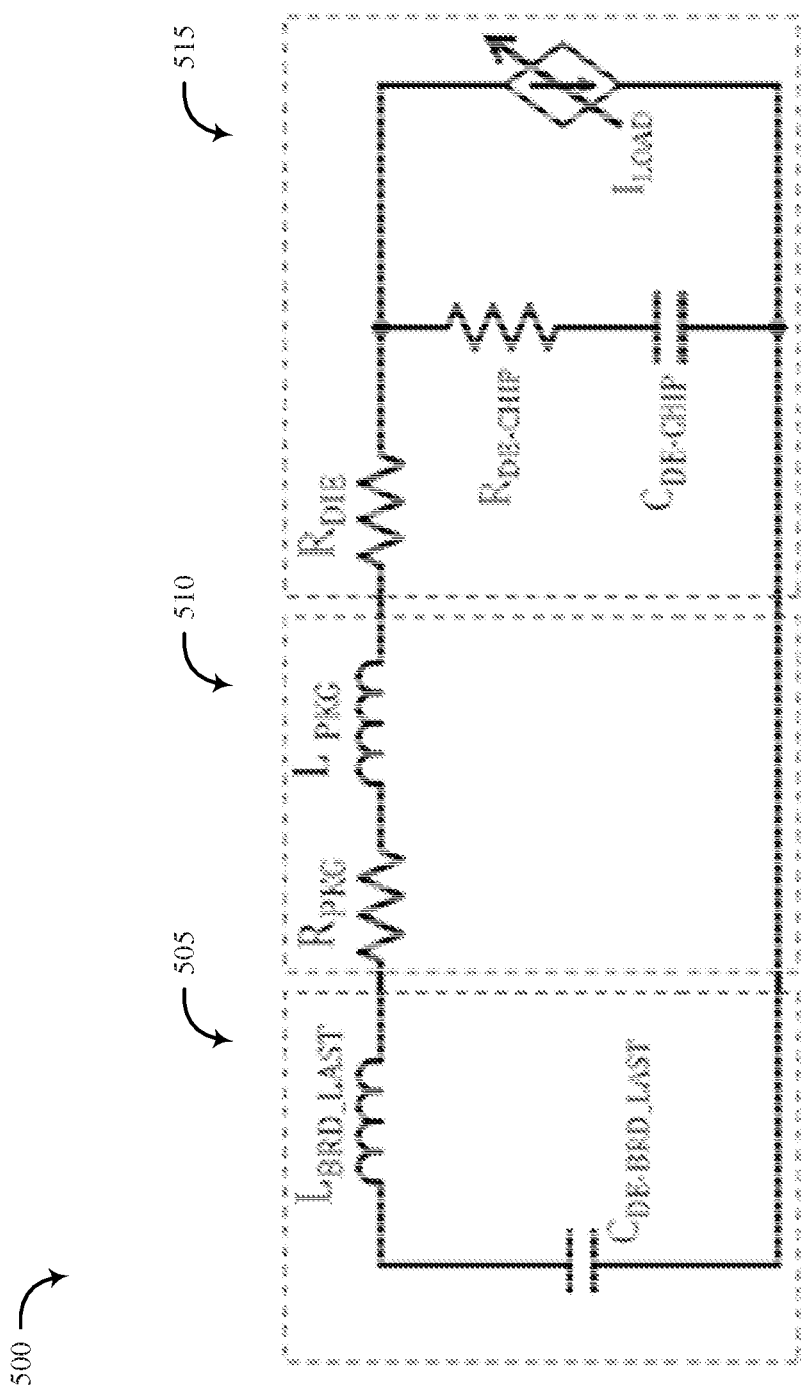
FIG. 5 shows one embodiment of an environment in accordance with various aspects of this disclosure.

FIG. 5 shows an environment 500 for selecting die and package parasitic for an IO power domain, in accordance with various examples. At least one aspect of environment 500 may be implemented in conjunction with device 105 of FIG. 1, apparatus 205 of FIG. 2, and/or power design network module 250 depicted in FIGS. 2, 3, and/or 4. In one embodiment, environment 500 depicts a simplified system model.

In one embodiment, to select a package and die parasitic, a lumped circuit model of a power distribution system may be reduced. For example, lumped circuit model of the power distribution system may include a VRM section, a board or PCB section, a package section, and a die section. The VRM section may include one or more voltage regulator module (VRM) resistors, one or more VRM capacitors and one or more VRM inductors. The board section may include one or more board resistors, one or more board inductors, one or more decoupling board capacitors with equivalent series resistor and inductor. The package section may include one or more package resistors, one or more package inductors, one or more decoupling package capacitors with equivalent series resistor and inductor. The die section may include one or more die resistors, one or more die inductors, one or more decoupling die capacitors with equivalent series resistor and inductor.

As depicted, environment 500 may include a board section 505, a package section 510, and a die section 515. In one embodiment, the lumped circuit model of the power distribution system described above may be simplified into the circuit model depicted in environment 500. In one embodiment, the one or more decoupling capacitors, resistors, and/or inductors may be removed from the board and/or package of the lumped circuit model of the power distribution system, resulting in the depicted circuit model of environment 500. In some cases, the VRM section of the lumped circuit model of the power distribution system may be removed, resulting in the depicted circuit model of environment 500.

As illustrated, the resulting minimized circuit model may result in board section 505 with a last board inductor ($L_{BRD\_LAST}$) and a last decoupling capacitor ($C_{DE-BRD-LAST}$); package section 510 with a package resistor ($R_{PKG}$) and a package inductor ($L_{PKG}$); and die section 515 with a die resistor ($R_{DIE}$), a decoupling die resistor ($R_{DE-CHIP}$), and a decoupling die capacitor ($C_{DE-CHIP}$). In one embodiment, the last board inductor ($L_{BRD\_LAST}$) may be the effective inductance after a last decoupling capacitor on board.

Figure 6:
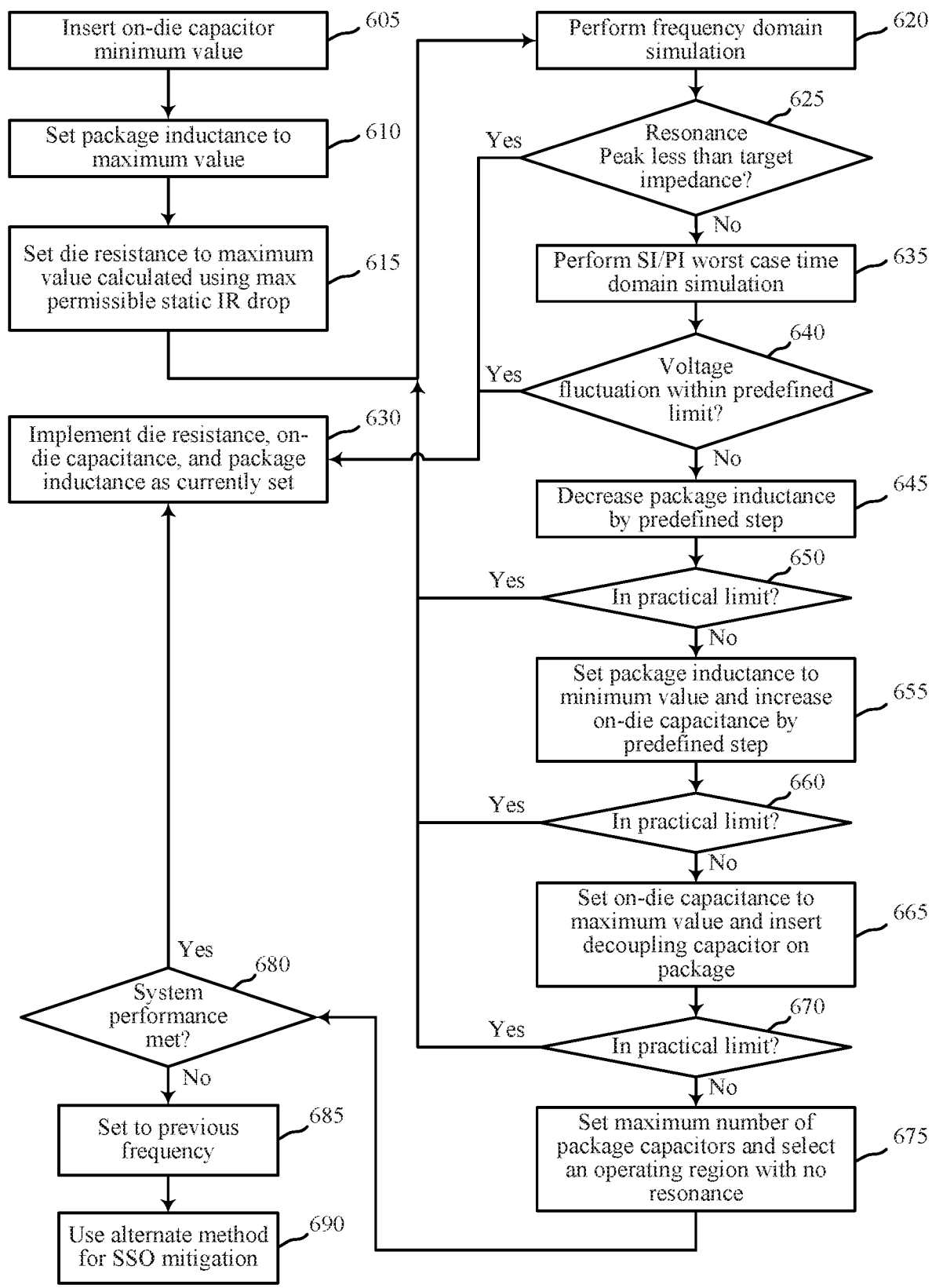
FIG. 6 is a flow chart illustrating an example of a method in accordance with various aspects of this disclosure.

FIG. 6 is a flow chart illustrating an example of a method 600 for selecting die and package parasitic for an IO power domain, in accordance with various aspects of the present disclosure. In some cases, method 600 may perform one or more operations to reach predetermined PDN design goals. One or more aspects of the method 600 may be implemented in conjunction with device 105 of FIG. 1, apparatus 205 of FIG. 2, and/or power design network module 250 depicted in FIGS. 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, the method 600 may include inserting an on-die capacitor of a minimum value into a circuit model (e.g., the circuit model of FIG. 5). In one embodiment, a minimum value for the on-die capacitor (e.g., a decoupling capacitor) may be set so that the on-die capacitor provides sufficient switching current to IOs in Δt switching time.

As indicated above, current through the capacitor is related to capacitance as shown in equation 2 (Eq. 2), provided again below.

$$I = \frac{\Delta Q}{\Delta t} = C \frac{\Delta V}{\Delta t} \quad \text{(Eq. 2)}$$

The minimum value of the on-die capacitor may be provided as shown below in equation 4 (Eq. 4).

$$C_{DIE} = (N \times I_{switching}) \frac{\Delta t}{\Delta V} \quad \text{(Eq. 4)}$$

In Eq. 4, $C_{DIE}$ may be defined as the minimum value of the on-die capacitor; Δt may be defined as switching time of IO in seconds; ΔV may be defined as IO supply voltage multiplied by the decimal form of the percentage of voltage drop allowed in volts; $I_{switching}$, may be defined as a maximum instantaneous current of a single IO in Amperes; and N may be defined as the number of IO switching simultaneously. In one embodiment, the number of simultaneously switching IO may satisfy a Probability Theorem and a System Performance. The Probability theorem may be defined as the maximum number of IOs out of the total number of IOs in the system that could, at any given instant of time, switch simultaneously. The System Performance may be defined as the minimum number of IOs required to switch simultaneously to meet a target performance. Thus, N of Eq. 4 may be selected to a minimum value provided by System Performance that does not violate the Probability Theorem.

At block 610, the method 600 may include setting the package inductance to a maximum value and inserting the package inductor at the maximum value in the circuit model. In one embodiment, the target impedance ($Z_{Target}$) of the circuit model may be defined to provide sufficient charging current (e.g., $I(f)=N \times I_{switching}$) to the on-die decoupling capacitor without dropping the voltage on the supply rail outside a given voltage tolerance limit, as shown below in equation 5 (Eq. 5).

$$Z_{Target} = \frac{IO \text{ Supply Voltage} \times \frac{(V_{ripple\ tolerance}\ \%)}{100}}{(N \times I'_{Switching})} \quad \text{(Eq. 5)}$$

In Eq. 5, $Z_{Target}$ may be defined as maximum allowable impedance; $V_{ripple\_tolerance}\%$ may be defined as the voltage noise tolerance for the IC die; ($I_{switching}$, may be defined as the maximum instantaneous current of a single IO in Amperes; and N may be defined as the number of IO switching simultaneously.

In one embodiment, the package inductor ($L_{pkg}$) may play a role in charging of the on-die capacitor and may be responsible for dynamic (L×dI/dt) drop. The impedance of the package inductance may increase linearly as operating frequency increases. In some cases, below a certain operating frequency, the impedance of the package inductance may be insignificant.

In one embodiment, to provide the sufficient charging current to on-die decoupling capacitor, package impedance ($Z_{PKG}$) may be configured to be less than or equal to the target impedance $Z_{Target}$ ($Z_{PKG} \leq Z_{Target}$), and where $R_{PKG}+R_{DIE}+j\omega L_{PKG} \leq Z_{Target}$, $j\omega L_{PKG}$ being the complex impedance ($Z_L$) of the package inductance.

In one embodiment, a resistive term may be neglected for maximum package inductance. In one embodiment, the maximum value of the package inductor, based on a maximum operating frequency $F_{MAX}$, may be provided as shown below in equation 6 (Eq. 6).

$$L_{PKGMAX} = \frac{Z_{Target}}{2 \times pi \times F_{Max}} \quad \text{(Eq. 6)}$$

At block 615, the method 600 may include setting a die resistance to a maximum value and inserting the die resistor at the maximum value in the circuit model. In some cases, the maximum value of the die resistance may be calculated based at least in part on a maximum permissible standard IR drop. In one embodiment, the impedance peak at resonance may be minimized by increasing die resistance ($R_{DIE}$) in FIG. 7.

Figure 7:
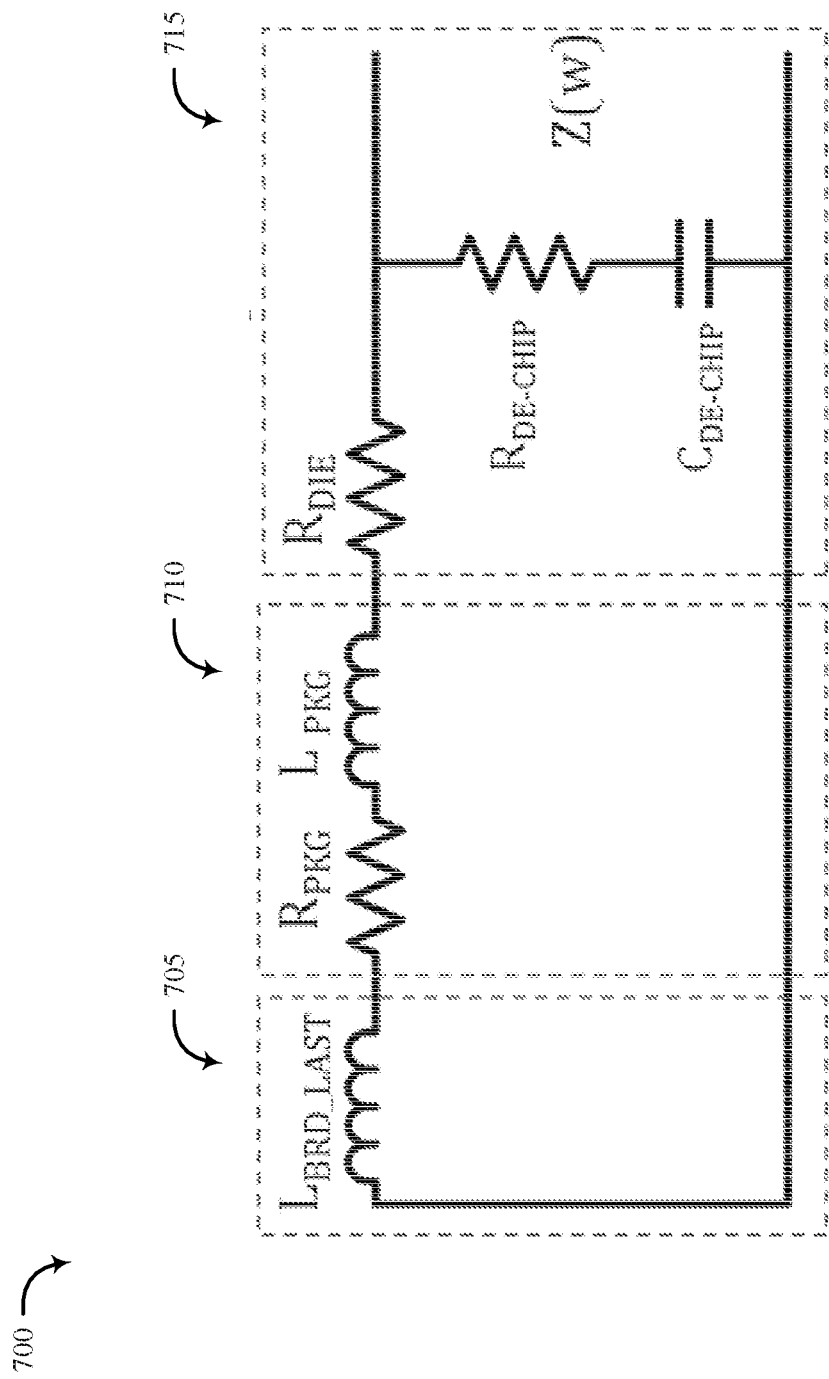
FIG. 7 shows another embodiment of an environment in accordance with various aspects of this disclosure.

FIG. 7 shows an environment 700 for selecting die and package parasitic for an IO power domain, in accordance with various examples. At least one aspect of environment 700 may be implemented in conjunction with apparatus 205 of FIG. 2, and/or power design network module 250 depicted in FIGS. 2, 3, and/or 4. In one embodiment, environment 700 may depict a simplified RLC circuit model of the present systems and methods. In some cases, a value of the die resistance may be selected to ensure the die resistance does not cross a predetermined maximum permissible static IR drop and to ensure the die resistance gives minimum peak on an impedance profile at resonance frequency. In one example, the maximum permissible static IR drop may be any value in the range of 1-5% of IO supply voltage.

Returning to FIG. 6, at block 620 the method 600 may include performing a frequency domain analysis of at least a portion of the circuit model. In one embodiment, the on-die capacitor may form a parallel LC tank circuit with the package inductor based on a simplified form of the circuit model of FIG. 7.

Figure 8:
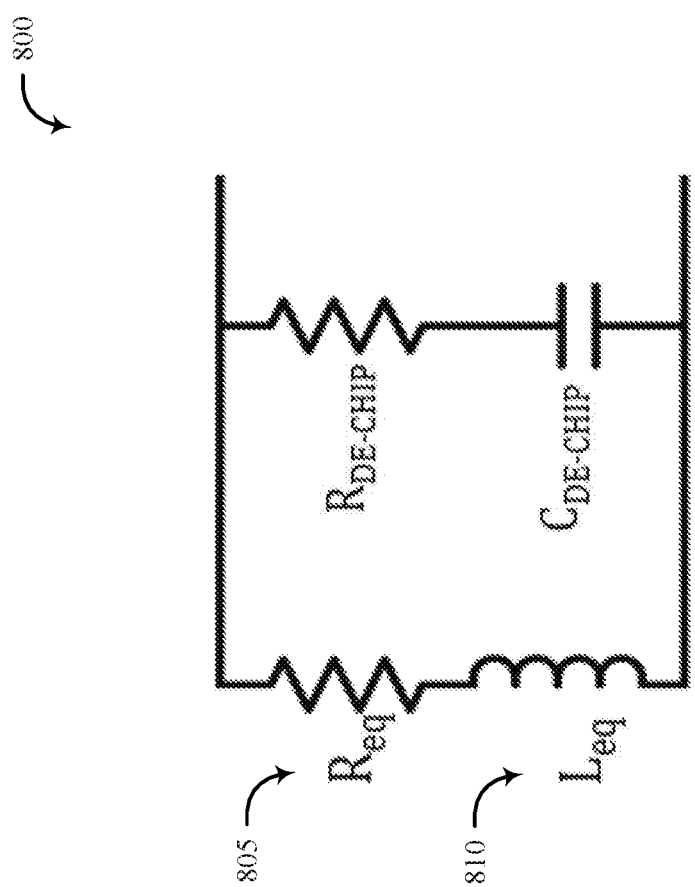
FIG. 8 shows another embodiment of an environment in accordance with various aspects of this disclosure.

FIG. 8 shows an environment 800 for selecting die and package parasitic for an IO power domain, in accordance with various examples. At least one aspect of environment 800 may be implemented in conjunction with apparatus 205 of FIG. 2, and/or power design network module 250 depicted in FIGS. 2, 3, and/or 4.

In one embodiment, environment 800 depicts a simplified circuit model of the FIG. 7 circuit model. To simplify the circuit model of FIG. 7, an equivalent resistance 805 ($R_{eq}$) may be defined as the sum of package resistance and die resistance, while an equivalent inductance 810 ($L_{eq}$) may be defined as the sum of the last board inductance and package inductance. Thus, the on-die capacitor may form a parallel LC tank circuit with the package inductor as shown in the circuit model of FIG. 8. In one embodiment, the impedance Z(w) of the tank circuit of FIG. 8 in the die section 515 is provided as shown below in equation 7 (Eq. 7).

$$Z(w)=(R_{eq}+X_{L_{eq}})\|(R_{DE\text{-}CHIP}+X_{C_{DE\text{-}CHIP}}) \quad \text{(Eq. 7)}$$

In Eq. 7, the equivalent resistance $R_{eq}$ may be defined as the sum of the package resistance and die resistance (i.e., $R_{eq}=R_{PKG}+R_{DIE}$); the equivalent inductance $L_{eq}$ may be defined as the sum of the last board inductance and package inductance (i.e., $L_{eq}=L_{BRD\_LAST}+L_{PKG}$); $X_{L_{eq}}$ may be defined as the inductive reactance of the equivalent inductance; $R_{DE\text{-}CHIP}$ may be defined as the decoupling die resistance; and $X_{CDE\text{-}CHIP}$ may be defined as the capacitive reactance of the die decoupling capacitance.

Returning to FIG. 6, at block 625, the method 600 may include determining whether a resonance peak is less than predetermined target impedance. In some cases, method 600 may make determinations relative to the peak of resonance based at least in part on the frequency domain analysis of block 620.

In one embodiment, the impedance of the LC tank circuit varies linearly from $R_{eq}$ at low frequency to $R_{DE\text{-}CHIP}$ at high frequency. At resonance frequency, the impedance is at maximum peak, which may exceed the target impedance ($Z_{Target}$). When the resonance frequency lies in an operating frequency region and impedance peak at resonance exceeds the target impedance, the on-die capacitor may not charge itself. This resonance problem may be solved by shifting the resonance peak to some higher frequency or mitigating the amplitude of peak at resonance frequency.

At block 630, upon determining the peak of resonance is less than the predetermined target impedance, the method 600 may include implementing the on-die capacitance as set in block 605, the package inductance as set in block 610 and the die resistance as set in block 615.

At block 635, upon determining the peak of resonance is not less than the predetermined target impedance, the method 600 may include performing signal integrity power integrity (SI/PI) worst case time domain simulation of at least a portion of the circuit model. At block 640, the method 600 may include determining whether a measured voltage fluctuation is within a predefined limit. In one embodiment, method 600 may perform the SI/PI worst-case simulation with required system operating frequencies, and check the voltage fluctuation on IO supply.

Upon determining the measured voltage fluctuation is within the predefined limit, at block 630 the method 600 may include implementing the on-die capacitance as set in block 605, the package inductance as set in block 610 and the die resistance as set in block 615. In one embodiment, when the voltage fluctuations are within the predefined limit, method 600 may determine PDN goals are met and current values for parasitic (e.g., die resistance, die capacitance, and package inductance) may be implemented even when resonance peaks exceed target impedance.

At block 645, upon determining the measured voltage fluctuation is not within the predefined limit, the method 600 may include decreasing the package inductance by a predefined decrementing step. In one embodiment, to mitigate the resonance peak, one of the possible solutions is to decrease the package inductance. In some cases, the package inductance may be decreased by a value determined based at least in part on an impedance profile obtained from the frequency domain analysis of block 620. As one example, the decrementing step for the package inductance may be any value in the range of 1-10% decrement of current inductance value.

In one embodiment, the package inductance may be decreased and frequency domain analysis may be performed again. The process may repeat until the practical limit of the package inductor is reached. In some cases, there is a practical limit (e.g., mechanical strength of package) below which package inductance $L_{pkg}$ may not decrease. Once the predefined practical limit is reached, method 600 may set the package inductor to the minimum value. By decreasing the package inductance, the resonance peak may shift to a higher frequency with a lesser amplitude nearer the target impedance.

At block 650, the method 600 may include determining whether the package inductance, decreased at block 645, reaches a predefined inductance practical limit. Upon determining the package inductance has not reached the predefined inductance practical limit, at block 620 the method 600 may include again performing a frequency domain analysis of at least a portion of the circuit model. In one embodiment, method 600 may repeat the operations of block 620 through 650 until the package inductance is within the predefined inductance practical limit.

At block 655, upon determining the practical limit of the package inductance is reached, the method 600 may include setting the package inductance to a minimum value and/or increasing the on-die capacitance by a predefined incremental step. As one example, the incrementing step for the on-die capacitance may be any value in the range of 1-10% increment of current capacitance value.

In one embodiment, increasing a capacitance value of the on-die decoupling capacitor is one solution to mitigate the resonance peak. In one embodiment, a value by which the capacitance may be increased may be based at least in part on an impedance profile obtained from the frequency domain analysis of block 620.

In one embodiment, on-die capacitor may be increased and the process of increasing the capacitance and again performing frequency domain analysis at 620 may repeat until the practical limit of the on-die capacitor is reached. In one embodiment, the practical limit of the on-die capacitor may be defined by the maximum die size and leakage current. When the practical limit of the on-die capacitor is reached, the method 600 may set the on-die capacitor to a maximum value and insert one or more decoupling capacitors on the package. In one embodiment, by increasing the on-die capacitor the resonance peak may shift to a lower frequency with lesser amplitude nearer the target impedance.

At block 660, the method 600 may include determining whether the on-die capacitance, increased at block 655, reaches a predefined capacitance practical limit.

Upon determining the on-die capacitance has not reached the predefined capacitance practical limit, at block 620 the method 600 may include again performing a frequency domain analysis of at least a portion of the circuit model. In one embodiment, method 600 may repeat the operations of block 620 through 660 until the on-die capacitance is within the predefined capacitance practical limit.

At block 665, the method 600 may include setting the on-die capacitor to a predetermined maximum value and inserting at least one decoupling capacitor on the package.

At block 670, the method 600 may include determining whether another decoupling capacitor may be placed on the package based at least in part on a maximum decoupling capacitor limit for the package. In one embodiment, to mitigate the resonance peak, another possible solution is to insert decoupling capacitors on package. The decoupling capacitor on package may divide the package inductance and resistance into two parts as shown in FIG. 9.

Figure 9:
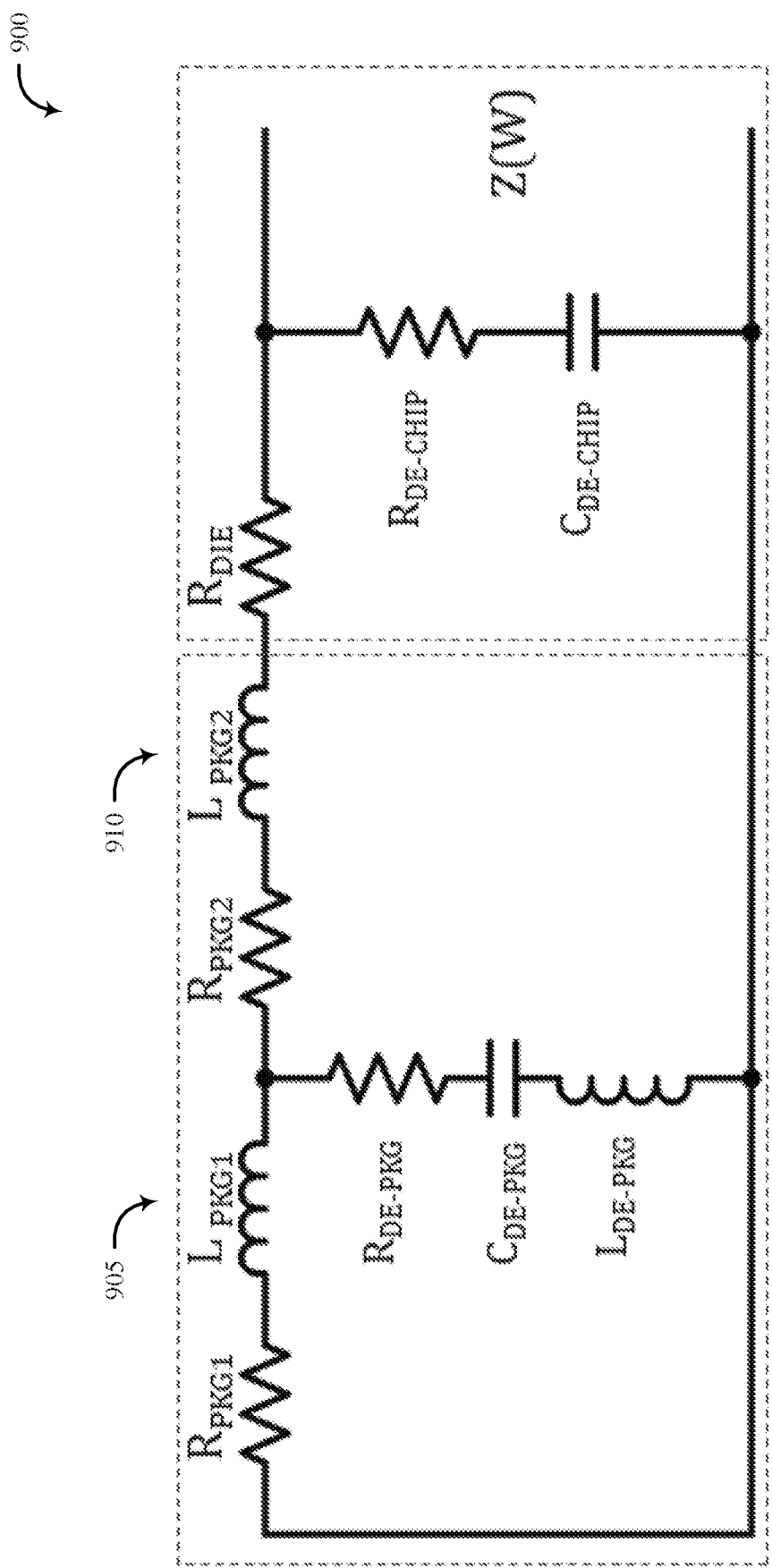
FIG. 9 shows another embodiment of an environment in accordance with various aspects of this disclosure.

FIG. 9 shows an environment 900 for selecting die and package parasitic for an IO power domain, in accordance with various examples. At least one aspect of environment 900 may be implemented in conjunction with apparatus 205 of FIG. 2, and/or power design network module 250 depicted in FIGS. 2, 3, and/or 4. As depicted, environment 900 depicts a circuit model of the present systems and methods. In particular, environment 900 depicts the decoupling capacitor on package dividing the package inductance into two parts $L_{pkg1}$ 905 and $L_{pkg2}$ 910 and package resistance into two parts $R_{pkg1}$ and $R_{pkg2}$ as shown in FIG. 9. In some embodiments, a second order tank circuit may be formed with two resonance peaks at frequencies F1 and F2 whose amplitudes are less than the original resonance peak and nearer the target impedance (ZTarget). In one embodiment, the value of the package capacitor may be selected so that the self-resonance of the package capacitor occurs at the same frequency as the maximum resonance peak of the package inductance and on-die capacitors.

Returning to FIG. 6, upon determining the maximum decoupling capacitor limit is not yet reached, indicating a maximum number of decoupling capacitors has not been placed on the package, at block 620 the method 600 may include again performing a frequency domain analysis in relation to at least a portion of the circuit model. In one embodiment, method 600 may repeat the operations of block 620 through 670 until the maximum number of decoupling capacitors has been placed on package.

At block 675, upon determining the maximum number of decoupling capacitors has been placed on package, the method 600 may include selecting a maximum number of package capacitors and selecting system frequency in operating region with no resonance.

At block 680, the method 600 may include determining whether system performance is satisfied. Upon determining system performance is satisfied, at block 630 the method 600 may include implementing the on-die capacitance as currently set, the package inductance as currently set and the die resistance as currently set.

Upon determining system performance is not satisfied, at block 685, the method 600 may include implementing a previous operating frequency. At block 690, the method 600 may include implementing an alternate method for simultaneously switching output (SSO) mitigation.

In some embodiments, when the power network still has resonance problems, it may be because the impedance peak at the resonance frequency is higher than the defined target impedance between DC and maximum target frequency. To bypass this resonance problem, method 600 may shift the operating frequency to another range with less resonance peak and then method 600 may again check the system performance at the new shifted operating frequency. When system performance is met, the current package and die values may be implemented. When system performance fails to be met, method 600 may set the operating frequency to a previous or original value, and use alternate methods to mitigate the resonance problems.

The operation(s) at block 605-690 may be performed using the power design network module 250 described with reference to FIGS. 2-4 and/or another module. Thus, the method 600 may provide for selecting die and package parasitic for an IO power domain. It should be noted that the method 600 is just one implementation and that the operations of the method 600 may be rearranged, omitted, and/or otherwise modified such that other implementations are possible and contemplated.

Figure 10:
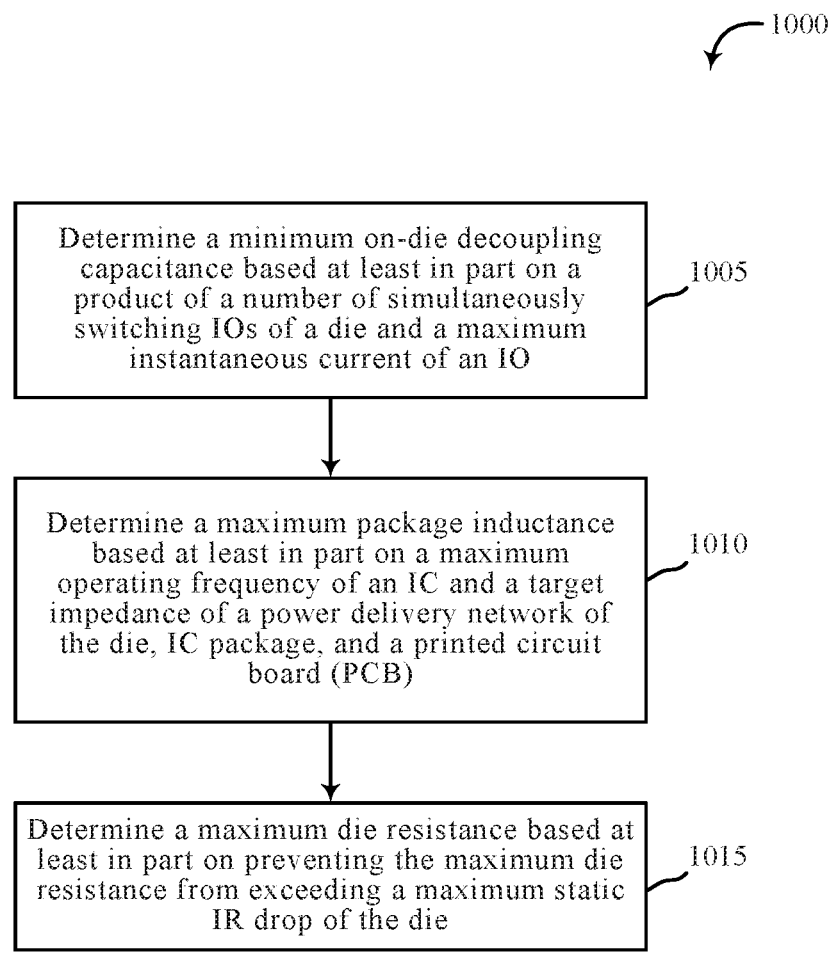
FIG. 10 is a flow chart illustrating an example of a method in accordance with various aspects of this disclosure.

FIG. 10 is a flow chart illustrating an example of a method 1000 for selecting die and package parasitic for an IO power domain, in accordance with various aspects of the present disclosure. One or more aspects of the method 1000 may be implemented in conjunction with device 105 of FIG. 1, apparatus 205 of FIG. 2, and/or power design network module 250 depicted in FIGS. 2, 3, and/or 4. In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 1005, the method 1000 may include determining a minimum on-die decoupling capacitance based at least in part on a product of a number of simultaneously switching IOs of a die and a maximum instantaneous current of a particular 10. At block 1010, the method 1000 may include determining a maximum package inductance based at least in part on a maximum operating frequency of an IC and a target impedance of a power delivery network of the die, IC package, and a printed circuit board (PCB). At block 1015, the method 1000 may include determining a maximum die resistance based at least in part on preventing the maximum die resistance from exceeding a maximum static IR drop of the die.

The operations at blocks 1005-1015 may be performed using the power design network module 250 described with reference to FIGS. 2-4 and/or another module. Thus, the method 1000 may provide for selecting die and package parasitic for an IO power domain. It should be noted that the method 1000 is just one implementation and that the operations of the method 1000 may be rearranged, omitted, and/or otherwise modified such that other implementations are possible and contemplated.

In some examples, aspects from two or more of the methods 600 and 1000 may be combined and/or separated. It should be noted that the methods 600 and 1000 are just example implementations, and that the operations of the methods 600 and 1000 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and dies that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, for example, a combination of a DSP and a microprocessor, multiple microprocessors, one or more microprocessors in conjunction with a DSP core, and/or any combination thereof.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, or any combination thereof, then the coaxial cable, fiber optic cable, twisted pair, DSL, or wireless technologies such as infrared, radio, and/or microwave are included in the definition of medium. Disk and disc, as used herein, include any combination of compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A computer system comprising:
   one or more processors, memory in electronic communication with the one or more processors, and instructions stored in the memory, the instructions being executable by the one or more processors to perform the steps of:
   determining a minimum on-die decoupling capacitance based at least in part on a product of a number of simultaneously switching input-outputs (IOs) of a die and a maximum instantaneous current of an IO;
   determining a maximum package inductance based at least in part on a maximum operating frequency of an integrated circuit (IC) and a target impedance of a power delivery network of the die, IC package, and a printed circuit board (PCB); and
   determining a maximum die resistance based at least in part on preventing the maximum die resistance from exceeding a maximum static IR drop of the die.

2. The computer system of claim 1, wherein the minimum on-die decoupling capacitance is based at least in part on a ratio of switching time of an IO to IO supply voltage multiplied by percentage of voltage drop allowed, and wherein the switching time is constant for a given IO.

3. The computer system of claim 2, wherein the target impedance is based at least in part on a product of the output supply voltage and a voltage noise tolerance of the die.

4. The computer system of claim 3, wherein the voltage noise tolerance is a percentage of voltage drop allowed when the IOs are switching.

5. The computer system of claim 1, wherein the target impedance is based at least in part on a product of the number of simultaneously switching IOs of the die and the maximum instantaneous current of an IO.

6. The computer system of claim 1, wherein the one or more processors are executable to perform further instructions for:
   performing a first frequency domain analysis to determine whether a peak resonance associated with a package inductance and the on-die capacitance satisfies the target impedance.

7. The computer system of claim 6, wherein the one or more processors are executable to perform further instructions for:
   upon determining the peak resonance fails to satisfy the target impedance, determining voltage fluctuations of the output supply voltage based at least in part on signal integrity power integrity (SI/PI) worst-case analysis; and
   determining whether the voltage fluctuations are within a predetermined limit.

8. The computer system of claim 7, wherein the one or more processors are executable to perform further instructions for:
   upon determining the voltage fluctuations are within the predetermined limit, implementing the minimum on-die decoupling capacitance, the maximum package inductance, and the maximum die resistance.

9. The computer system of claim 7, wherein the one or more processors are executable to perform further instructions for:
   upon determining the voltage fluctuations are outside the predetermined limit, repetitively decreasing the package inductance by a predetermined decrement and re-determining voltage fluctuations for each decrease until the re-determined voltage fluctuations are within the predetermined limit, or until reaching a minimum package inductance; and
   implementing a package inductance that satisfies the predetermined limit or the minimum package inductance.

10. The computer system of claim 7, wherein the one or more processors are executable to perform further instructions for:
    upon determining the voltage fluctuations are outside the predetermined limit, repetitively increasing the on die capacitance by a predetermined increment and re-determining voltage fluctuations for each increase until the re-determined voltage fluctuations are within the predetermined limit, or until reaching a maximum on die capacitance; and
    implementing an on die capacitance that satisfies the predetermined limit or the maximum on die capacitance.

11. The computer system of claim 7, wherein the one or more processors are executable to perform further instructions for:
    upon determining the voltage fluctuations are outside the predetermined limit, adding one or more decoupling capacitors to the IC package.

12. The computer system of claim 7, wherein the one or more processors are executable to perform further instructions for:
  upon determining the voltage fluctuations are outside the predetermined limit, shifting an operating frequency from a first range to a second range; and
  determining again whether the system performance is met and the voltage fluctuations are within the predetermined limit or whether the peak resonance satisfies the target impedance, or both.

13. The computer system of claim 12, wherein the one or more processors are executable to perform further instructions for:
  upon determining the system performance is met and the voltage fluctuations are within the predetermined limit, or the peak resonance satisfies the target impedance, or both, implementing a current value of the on-die decoupling capacitance, a current value of the package inductance, and a current value of the die resistance; and
  upon determining the system performance is not met, or the voltage fluctuations are outside the predetermined limit and the peak resonance fails to satisfy the target impedance, or both, shifting the operating frequency back to the first range and implementing an alternate process to mitigate the peak resonance.

14. The computer system of claim 1, wherein the one or more processors are executable to perform further instructions for:
  upon determining the peak resonance satisfies the target impedance, implementing the minimum on-die decoupling capacitance, the maximum package inductance, and the maximum die resistance.

15. An apparatus comprising: one or more processors memory in electronic communication with the one or more processors, and instructions stored in the memory, the instructions being executable by the one or more processors to perform the steps of:
  determining a minimum on-die decoupling capacitance based at least in part on a product of a number of simultaneously switching input-outputs (IOs) of the die and a maximum instantaneous current of an IO;
  determining a maximum package inductance based at least in part on a maximum operating frequency of an integrated circuit (IC) and a target impedance of a power delivery network of the die, the IC package, and a printed circuit board (PCB); and
  determining a maximum die resistance based at least in part on preventing the maximum die resistance from exceeding a maximum static IR drop of the die.

16. The apparatus of claim 15, wherein the minimum on-die decoupling capacitance is based at least in part on a ratio of switching time of an IO to IO supply voltage multiplied by percentage of voltage drop allowed, and wherein the switching time is constant for given IO.

17. The apparatus of claim 16, wherein the target impedance is based at least in part on a product of the output supply voltage and a voltage noise tolerance of the die.

18. The apparatus of claim 17, wherein the voltage noise tolerance is a percentage of voltage drops allowed when the die output is switching.

19. A method comprising:
  determining a minimum on-die decoupling capacitance based at least in part on a product of a number of simultaneously switching input-outputs (IOs) of the die and a maximum instantaneous current of an IO, the minimum on-die decoupling capacitance being based at least in part on a ratio of switching time of an IO to IO supply voltage multiplied by percentage of voltage drop allowed;
  determining a maximum package inductance based at least in part on a maximum operating frequency of an integrated circuit (IC) and a target impedance of a power delivery network of the die, the IC package and a printed circuit board (PCB); and
  determining a maximum die resistance based at least in part on preventing the maximum die resistance from exceeding a maximum static IR drop of the die.

20. The method of claim 19, wherein the target impedance is based at least in part on a product of the output supply voltage and a voltage noise tolerance of the die, and wherein the voltage noise tolerance is a percentage of voltage drop allowed when the die output is switching.

* * * * *